(12) United States Patent
Berthold (10) Patent No.: US 6,434,290 B1
(45) Date of Patent: Aug. 13, 2002

(54) OPTICAL SWITCH HAVING SUBSTANTIALLY EQUAL OUTPUT POWERS

(75) Inventor: Joseph E. Berthold, Clarksville, MD (US)

(73) Assignee: Ciena Corporation, Linthicum, MD (US)

(*) Notice: Subject to any disclaimer, the term of this patent is extended or adjusted under 35 U.S.C. 154(b) by 0 days.

(21) Appl. No.: 09/626,182

(22) Filed: Jul. 27, 2000

(51) Int. Cl.$^7$ .................................. G02B 6/35
(52) U.S. Cl. ............................ 385/18; 385/17
(58) Field of Search .................. 385/14–16, 18, 385/17

(56) References Cited

U.S. PATENT DOCUMENTS 6,097,859 A * 8/2000 Solgaard et al. ............... 385/17

* cited by examiner

Primary Examiner—John D. Lee
Assistant Examiner—Jerry T Rahll
(74) Attorney, Agent, or Firm—David L. Soltz

(57) ABSTRACT

An optical switch is described having a plurality of optical input ports, and a plurality of optical output ports. A plurality of mirrors are further included, each of which being configured to direct at least a portion of an optical signal supplied to one of the plurality of optical input ports to a corresponding one of the plurality of optical output ports, such that an intensity associated with each of said plurality of optical signals output from the optical switch is substantially the same.

21 Claims, 7 Drawing Sheets

OPTICAL SWITCH HAVING SUBSTANTIALLY EQUAL OUTPUT POWERS

BACKGROUND OF THE INVENTION

Fiber optic systems have been developed which transmit optical signals at a single wavelength. More recently, however, wavelength division multiplexing (WDM) has been explored for increasing the capacity of existing fiber optic networks. In a WDM system, plural transmitters emit optical signal channels, which are combined onto a single optical fiber, with each channel being assigned a particular wavelength. The optical signal channels are demultiplexed downstream from the transmitters, and converted into electrical signals in corresponding receivers for further processing.

Advances in optical component technologies have increased the channel counts in WDM systems. As a result, high capacity WDM systems carrying in excess of 40 channels or wavelengths are commercially available. With the added capacity, however, comes a need to effectively manage the bandwidth created by current WDM systems. Accordingly, switches have been incorporated into WDM systems to direct optical signals from one fiber. In certain applications, optical channels on one fiber are demutiplexed, converted to electrical signals, which are then used to generate optical signals on different fibers. However, electrical components in these devices are required to perform the optical-to-electrical (O/E) and then electrical-to-optical (E/O) conversion are expensive. Accordingly, all-optical switches have been developed which may cost considerably less than those requiring O/E and E/O conversion.

In an optical switch, optical signals at a particular wavelength are supplied through an input and directed toward an output through various switching mechanisms. The signals input to the switch, however, may not be of equal intensity, and thus, will not have equal intensity when output, in particular, if one channel is supplied from a transmitter located relatively close to the switch while another is located farther away. Moreover, the insertion loss for optical signals input to the switch is often wavelength-dependent. When these signals are supplied to an optical amplifier in a WDM system, power imbalances can occur, whereby certain channels are amplified more than others. After propagating through a chain of such amplifiers, the high power channels absorb most of the amplifier's energy, while the low power channels experience little if any gain and are practically indiscernible over noise inherently produced in these systems.

SUMMARY OF THE INVENTION

Consistent with the present invention, an optical switch is provided that outputs optical signals with substantially uniform intensity levels.

In particular, the optical switch consistent with the present invention includes a plurality of optical input ports, and a plurality of optical output ports. A plurality of mirrors are further included, each of which being configured to direct at least a portion of an optical signal supplied to one of the plurality of optical input ports to a corresponding one of the plurality of optical output ports such that an intensity associated with each of the plurality of optical signals output from the optical switch is substantially the same.

BRIEF DESCRIPTION OF THE DRAWINGS

Advantages of the present invention will be apparent from the following detailed description of the presently preferred embodiments thereof, which description should be considered in conjunction with the accompanying drawings in which.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
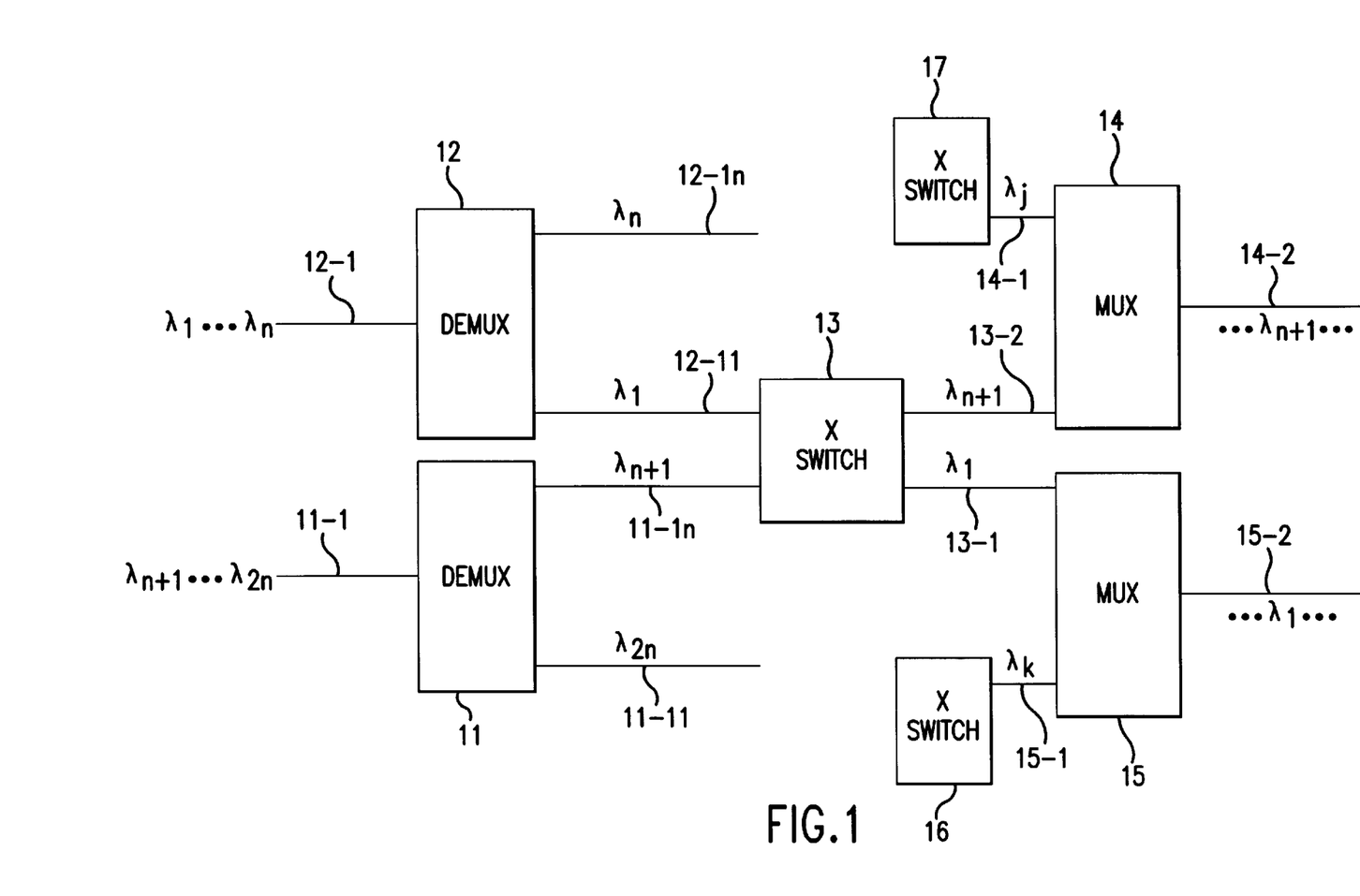
FIG. 1 illustrates an exemplary portion of a network including an optical switch consistent with the present invention.

FIG. 1 illustrates an exemplary network configuration 10 including known optical demultiplexers 11 and 12, each being coupled to optical fibers 11-1 and 12-1 carrying optical signals at wavelengths $\lambda_1$ to $\lambda_n$ and $\lambda_{n+1}$ to $\lambda_{2n}$, respectively. The switch consistent with the present invention, however, can be used in other network configurations, and is not limited to the configuration shown in FIG. 1.

Demultiplexers 11 and 12 each have a plurality of output lines, each carrying a 4 respective one of a plurality of optical signals. For example, lines 12-1n and 12-11 of demultiplexer 12 output optical signals at wavelengths $\lambda_1$ and $\lambda_n$, respectively, while lines and $\lambda_{n+1}$ and $\lambda_{2n}$ output optical signals at wavelengths $\lambda_{n+1}$ to $\lambda_{2n}$, respectively.

Lines 12-11 and 11-1n feed wavelengths at $\lambda_1$ to $\lambda_{n+1}$ to switch 13. As discussed in further detail below, switch 13 directs optical signals on line 11-1n to line 13-2, while optical signals on line 12-11 are output on line 13-1. Typically, switch 13 is reconfigurable so that light input on any input line can be routed to any output line, and the assignment of input lines to output lines can change in response to one or more control signals. In this case, however, light at wavelength $\lambda_{n+1}$ is supplied to line 13-2 and onto multiplexer 14, where the light is combined with other wavelengths, e.g., $\lambda_j$ supplied on line 14-1 from switch 17, and output onto line 14-2. As further shown in FIG. 1, light at wavelength $\lambda_1$ is supplied to multiplexer 15 and combined onto fiber 15-2 with other light, for example optical signals at wavelength $\lambda_k$ input on line 15-1 from switch 16.

Figure 2:
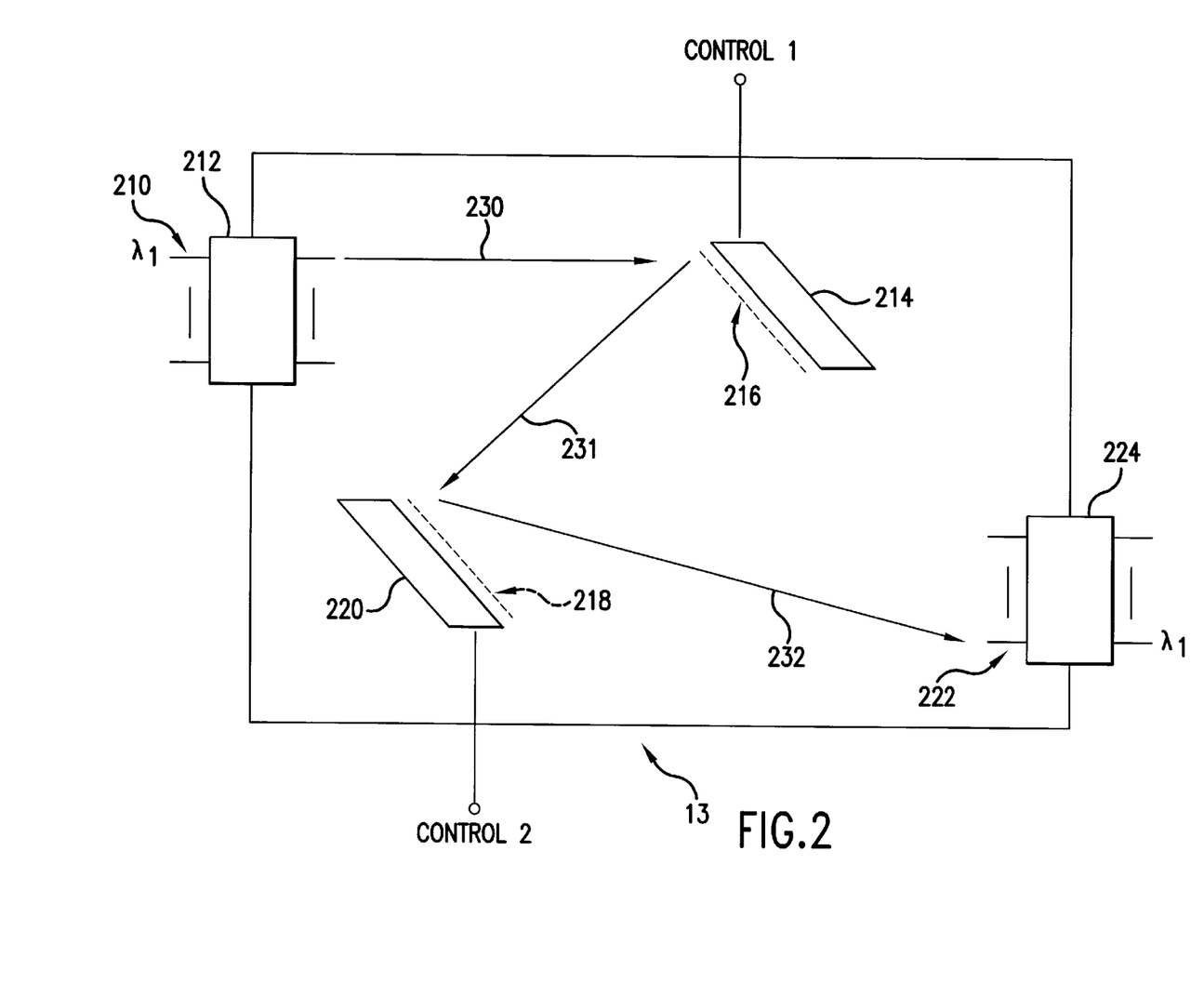
FIG. 2 shows a schematic block diagram of an optical switch consistent with the present invention.

FIG. 2 illustrates switch 13 in greater detail. By way of example, routing of light at wavelength $\lambda_1$ through switch 13 is described herein. One of ordinary skill would appreciate, however, that other wavelengths input on other ports can be routed through switch 13 in a similar manner. Moreover, switch 13 can be configured in any appropriate manner to direct light from any input to any output. Typically, however, there is a one-to-one correspondence between input ports and output ports.

As further shown in FIG. 2, switch 13 includes a plurality of optical input ports, each including a respective one of fibers 210, which extend through and are secured by mount 212. Optical signals at $\lambda_1$ input along line 12-11 are supplied to one of fibers 210, pass through mount 212 and propagate in a direction indicated by arrow 230 to a corresponding adjustable mirror within a first bank of mirrors 216 formed on substrate 214. Next, the $\lambda_1$ optical signals travel in a direction indicated by arrow 231 to an adjustable mirror with a second bank of mirrors 218 provided on substrate 220. The $\lambda_1$ optical signals are then reflected to a corresponding output port including one of fibers 222, which outputs the optical signals to multiplexer 15 shown in FIG. 1. Other optical signals propagate through switch 13 in a similar manner but are reflected by different mirrors in banks 216 and 218. Typically, each optical signal channel is reflected by a corresponding mirror in bank 216 and bank 218. Moreover, control signals CONTROL1 and CONTROL2 typically adjust the mirrors in banks 216 and 218, respectively, to reflect the input optical signals to desired output ports.

Figure 3:
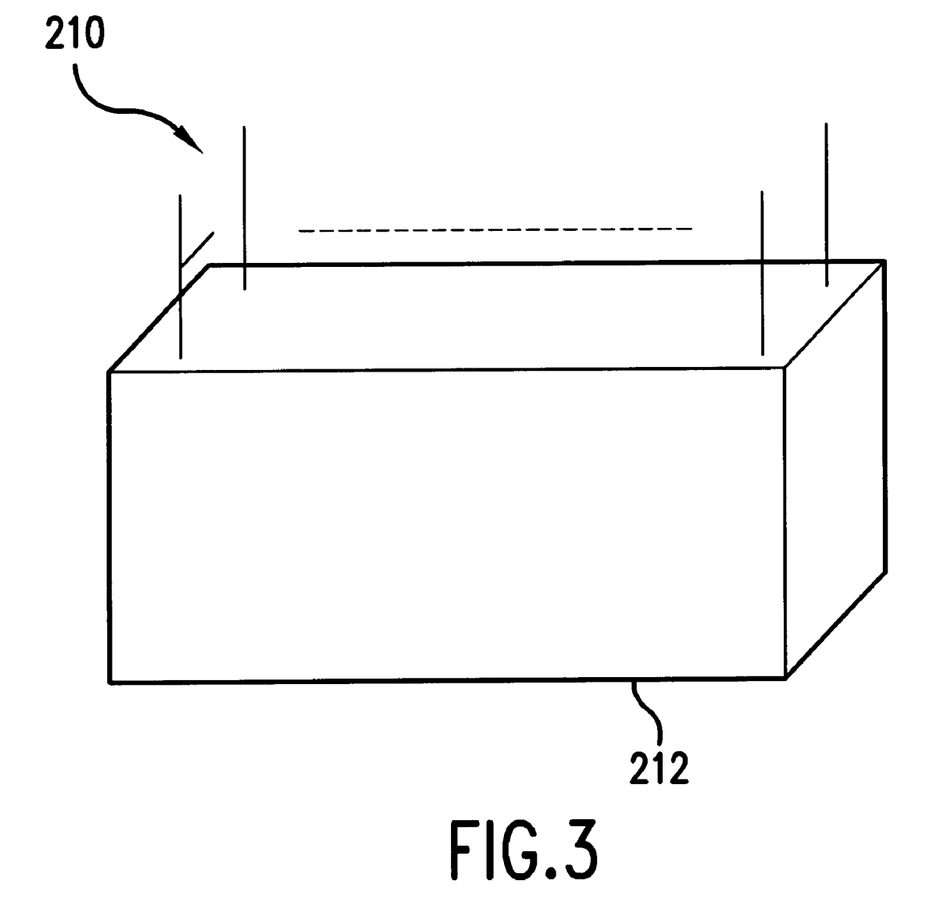
FIG. 3 illustrates a perspective view of an input/output section of an optical switch consistent with the present invention.

FIG. 3 illustrates mount 212 in greater detail. As further shown in FIG. 3, optical fibers 210 are secured by mount 212, and are typically arranged in an array. Mount 224 319 has a similar construction as mount 212, and fibers 222 are similarly arranged in mount 212 as fibers 210 in mount 212.

Each mirror within bank 216 is adjustable and can be rotated, in accordance with a control signal to direct an optical signal beam to a particular mirror in bank 218 and thus to a desired one of fibers 222. The mirrors in banks 216 and 218 are conventional and described further, for example, in U.S. Pat. No. 6,087,747, incorporated herein by reference. One of mirrors in bank 216 will now be discussed with referenced to FIGS. 4A–4D. Mirrors in bank 218 have a structure similar to that shown in FIGS. 4A to 4D.

Figure 4A:
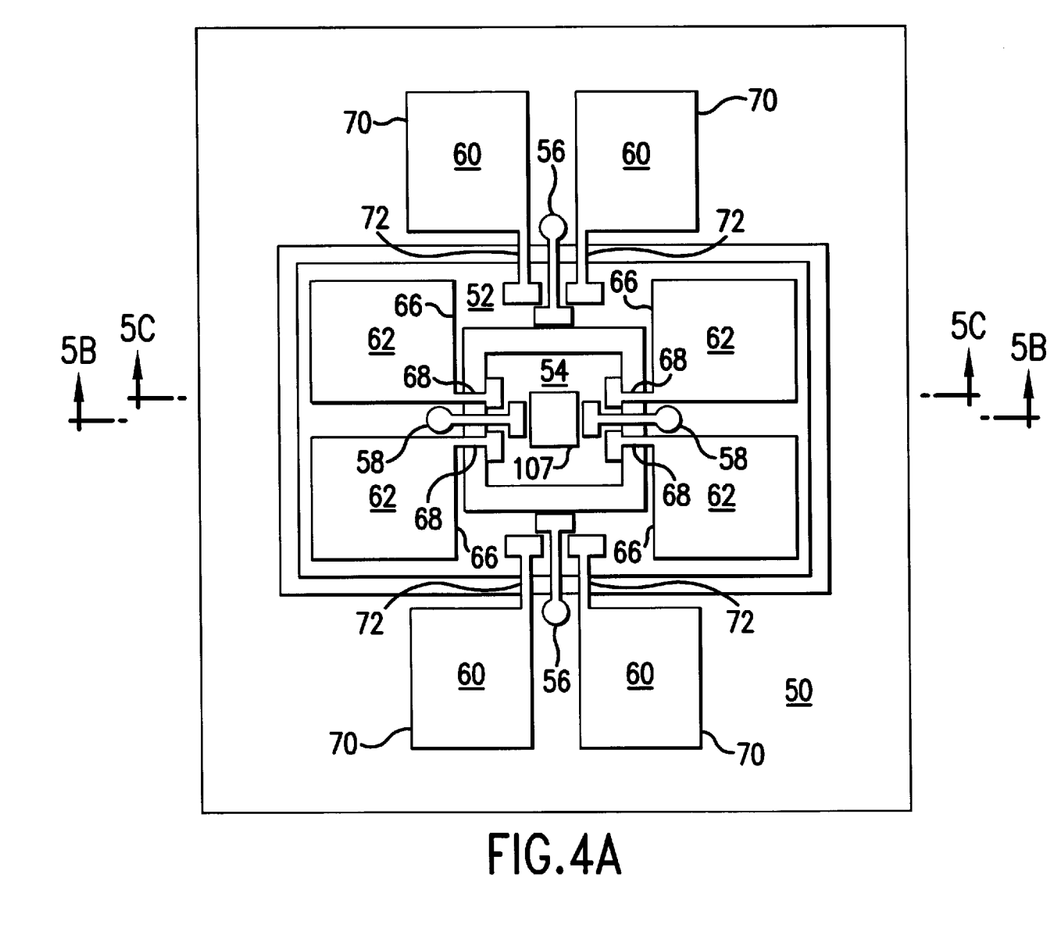
FIGS. 4A–4D illustrate plan and cross-sectional views of reflective elements incorporated into the optical switch consistent with the present invention.

The mirrors in banks 216 may be, for example, a silicon microelectromechanical rotating mirrors including a first frame 50 and a second frame 52 respectively surround the rotating plate 54. A first pair of beams 56 support the second frame 52 along a first axis relative to the first frame 50 so that the second frame 52 rotates about the first axis relative to the first frame 50. A second pair of beams 58 supports the plate 54 along a second axis relative to the second frame 52 so that the plate 54 rotates about the second axis relative to the second frame 50. As shown, the first axis of rotation and the second axis of rotation intersect at a 90° angle.

A first set of four actuators 60 is provided on the first frame 50 with one actuator on each side of each of the beams 56 of the first pair. These actuators 60 provide mechanical force for rotating the second frame 52 relative to the first frame 50 about the first axis which is defined by the first pair of beams 56. A second set of four actuators 62 is provided on the second frame 52 with one actuator on each side of each of the beams 58 of the second pair. These actuators 62 provide mechanical force for rotating the plate 54 relative to the second frame 52 about the second axis which is defined by the second pair of beams 58. In addition, both sets of actuators assist in positioning and supporting the movable plate and second frame. Accordingly, the plate can rotate independently about both the first axis of rotation and the second axis of rotation.

Figure 4B:
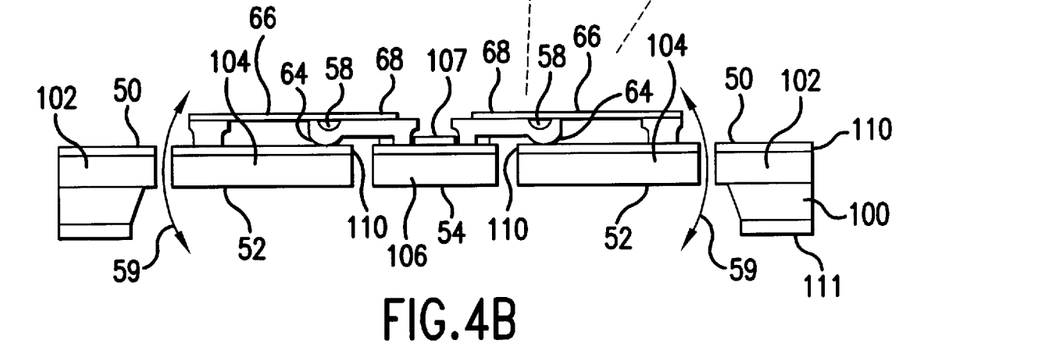

As shown in cross section in FIG. 4B, each of the beams 58 of the second pair extends from a side of the plate 54 and is fixedly connected thereto. Each beam 58 extends over the second frame 52 and is positioned adjacent the surface thereof for rotational movement. Accordingly, these beams 58 define the second axis of rotation about which the plate 54 rotates relative to the second frame 52. Because the beams 58 are not fixedly connected to both the plate 54 and the second frame 52, the torque required to rotate the plate about the second axis can be reduced. Furthermore, the arched contact surface 64 of each beam 58 adjacent the second frame 52 allows the beam to roll on the second frame during rotation of the plate 54 further reducing the torque required to rotate the plate.

As will be understood by one having skill in the art, the arched contact surface 64 can be rounded, pointed, or otherwise shaped to provide a rolling motion for the beam when the plate rotates. For example, with reference to FIG. 4D, in one embodiment, the arched contact surface 64 is pointed. In addition, the pair of second beams extending from opposite sides of the plate is defined to include a structure wherein the pair of beams are joined on the plate. In other words, the pair of second beams can be provided by a structure on the plate which extends across the plate and beyond opposite sides of the plate. The pair of first beams can be provided by a similar structure on the second frame raised to permit movement of the plate.

Alternately, the pair of second beams and the plate can be formed from a single layer of a material such as polysilicon so that the pair of second beams and the plate are confined within a single plane. Again, the pair of first beams and the second frame can similarly be formed from a single layer. The beams 56 extending from the second frame 52 operate in the same manner as discussed above with regard to the beams 58 extending from the plate 54.

Figure 4C:
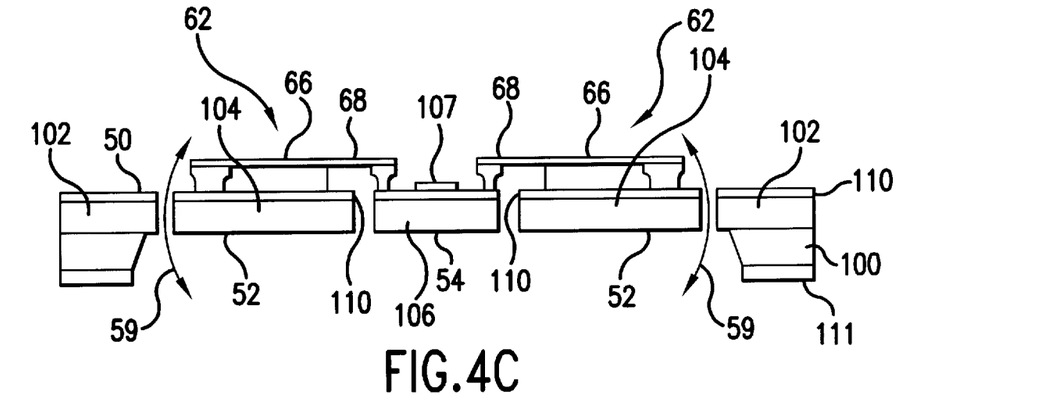
Figure 4D:
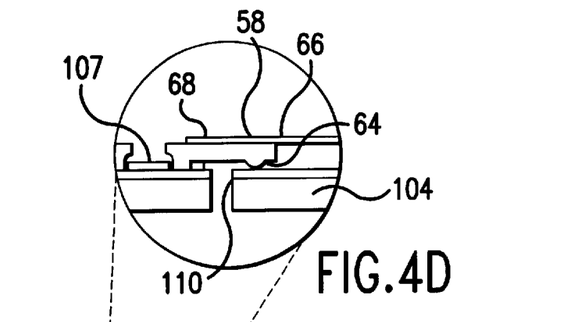

As shown in FIG. 4C, each of the actuators 62 includes at least one electrode 66 spaced apart from and electrically insulated from the second frame 52, and an arm 68 extending from the electrode 66 and attached to a portion of the plate 54 off the second axis. The electrode is an electrically conductive plate generally parallel to the second frame and spaced from it by supports, as illustrated in FIGS. 4B and 4C. The supports are preferably located at the edge of the electrode and are located on two sides, but this configuration may change as necessary or desirable to obtain the optimum combination of structural support and flexibility for movement.

Accordingly, a control signal, such as a potential difference between the electrode 66 and the second frame 52 will result in an electrostatic force which is transmitted via the arm 68 to the plate 54 thus rotating the plate 54 relative to the second frame 52. By attaching the arm 68 to the plate 54, the plate 54 and the second frame 52 can be maintained in a generally common plane when there is no potential difference between the electrode 66 and the second frame 52. The actuator 62 can thus provide a structure that supports the plate 54 relative to the second frame 52 and selectively biases it to induce desired rotation. Such biasing support can alternately be provided by micromachined springs which can be formed from the same material used to form the plate and the second frame. For example, serpentine springs may be formed between the plate and frame.

The rotation of the second frame 52 is illustrated by arrows 59 in FIGS. 4B and 4C. This rotation occurs in the plane of FIGS. 4B and 4C about the axis defined by the first pair of beams 56 (shown in FIG. 4A). The plate 54 rotates into and out of the plane of FIGS. 4B and 4C about the axis defined by the second pair of beams 58.

By generating a potential difference (control signal) between the electrode 66 and the second frame 52 at a location remote from the plate or its rotational arc, the electrode does not interfere with or intrude into the path of rotation of the plate 54. Accordingly, the electrode 66 can be closely spaced from the second frame 52 thus increasing the electrostatic force generated without reducing a range of motion for the plate 54. Furthermore, the useful size of the electrode 62 and the electrostatic forces generated thereby are not limited by the size of the plate 54.

The arm 68 preferably extends to a portion of the plate 54 closely spaced from the second axis. Accordingly, a relatively small displacement of the arm 68 can result in a relatively large rotation of the plate 54. As shown, the actuator arms 68 are fixedly connected to the plate 54 thus providing biasing support for the plate. Alternatively, the arms can extend adjacent to the plate without being fixedly connected thereto. Accordingly, the torque required to rotate the plate can be reduced because the arms are positioned adjacent the surface of the plate but are not attached to it. The insulating layer 110 forming the upper surface of the second frame can be used to prevent electrical shorts between the electrode 62 and the conductive portion of the second frame 52. The actuators 60 on the first frame including electrodes 70 and the arms 72 operate as discussed above with regard to the actuators 62 on the second frame.

By providing a reflective surface 107 on the plate, a rotating mirror is produced that can reflect light in a desired direction.

As noted above, optical signals input to switch 13 can be of different power levels or intensities. Moreover, the insertion loss for switch 13 can be wavelength-dependent. For example, optical signals at $\lambda_1$ input to switch 13 may have a relatively high intensity or may have less insertion loss, and thus have higher power propagating through switch 13 than $\lambda_k$ signals on line 15-1. If such $\lambda_1$ signals are combined with the line $\lambda_k$ signals onto fiber 15-2, spectral power imbalances can occur in optical amplifiers downstream from multiplexer 15. As a result, the lower power $\lambda_k$ signal can suffer from excessive noise accumulation, and have a low signal-to-noise ratio.

Figure 5:
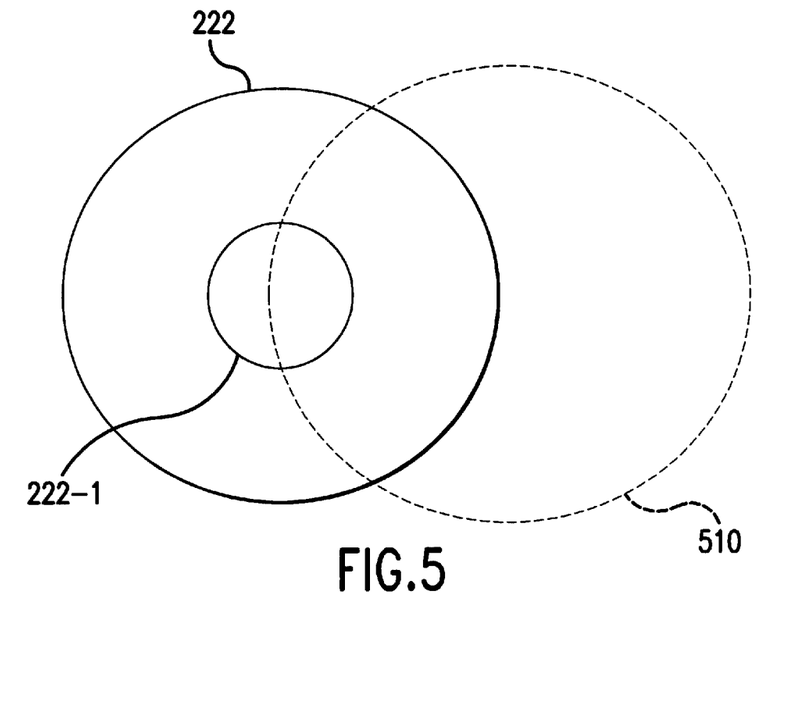
FIGS. 5 and 6 illustrate cross-sectional views of an optical fiber and signal beam at an output port of the optical switch consistent with the present invention.
Figure 6:
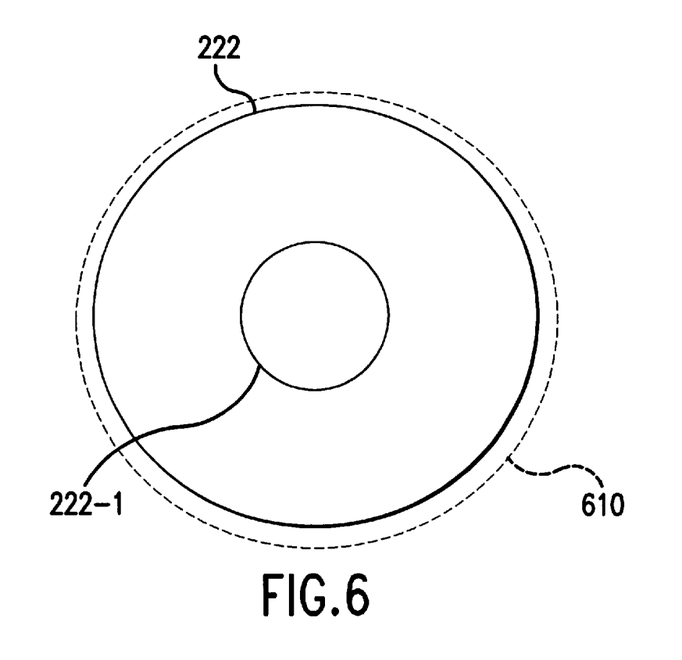

Thus, consistent with the present invention, the optical signals output from each port of each of switches 13, 16 and 17 typically have uniform intensity. In which case, in the example discussed above, optical signals at wavelength $\lambda_1$ should be attenuated relative to the optical signals at wavelength $\lambda_k$. Such attenuation can be achieved by adjusting appropriate mirrors to offset a central portion of the optical signal beam, as represented by dashed circle 510 in FIG. 5, from a central portion of the optical output port fiber, i.e., the high refractive index core present in the optical fiber. As further shown in FIG. 5, since the optical signal beam 510 does not directly impinge on core 222-1 of the optical output port fiber, less $\lambda_1$ light intensity is output from switch 13. If less attenuation is desired to equalize the power with another signal propagating through switch 13, however, a central portion of the optical signal beam 610 in FIG. 6 may be aligned with the central portion of the optical output port fiber, such as core 222-1. Accordingly, by appropriate adjustment of mirrors in banks 216 and 218, each of the optical output port fibers can receive a variable portion of the switched optical signals so that the optical signals output from the switch, as well as other switches in a network, can have substantially uniform optical power and intensity.

Figure 7:
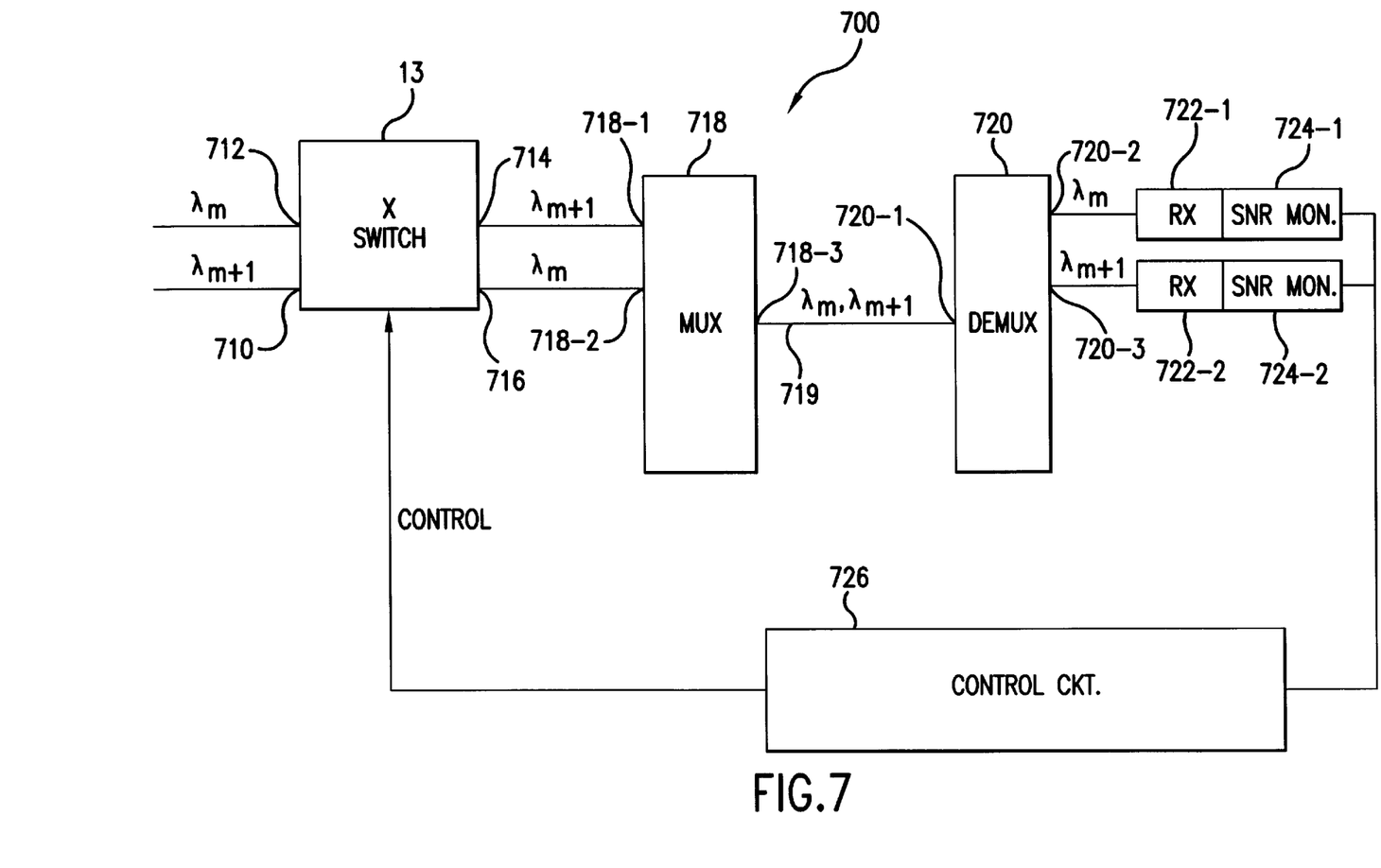
FIG. 7 illustrates an optical communication system in accordance with a further aspect of the present invention.

FIG. 7 illustrates an alternative embodiment of the present invention wherein switch 13 is provided in an optical communication system 700. In this embodiment, the output intensities of optical signals output from switch 13 are adjusted to be different to offset variable spectral gains and losses as the optical signals propagate to a receiver, so that an optical parameter associated with each optical signal is substantially equal at the receiver.

Optical communication system includes switch 13 having a similar construction to that described above. Switch 13 receives a plurality of optical signals, e.g., optical signals at wavelengths $\lambda_m$ and $\lambda_{m+1}$, and routes these signals to outputs 714 and 716 in manner similar to that described above. The optical signals are respectively supplied on input 718-2 and 718-1 of multiplexer 718 and combined onto optical fiber 719 through multiplexer output 718-3. One or more optical amplifier may be provided along fiber 719 if the optical signals are substantially attenuated over relatively long transmission distances. The optical signals are next fed to input 720-1 of demultiplexer 720, and supplied to respective receivers 722-1 and 722-2 through outputs 720-2 and 720-3. A control circuit 726 including monitor circuits 724-1 and 724-2 sense an optical parameter associated with each optical signal supplied to receivers 722. Typically, control circuit 726 outputs a control signal to switch 13 to adjust mirrors therein so that optical signals output from the switch have different intensities. The intensities are selected to offset any wavelength-dependent loss or gain experienced by the signals during propagation through multiplexer 718, fiber 719 (including amplifiers) and demultiplexer 720, for example, and to substantially equalize the sensed optical parameter for each optical signal. In the example shown in FIG. 7, the optical parameter is a signal-to-noise ratio (SNR) and the control signal is adjusted so that the SNR for each optical signal is substantially the same at receivers 722. Since the mirrors in switch 13 can adjust the intensity of individual output optical signals, the sensed optical signals can be controlled on a wavelength-by-wavelength basis.

While the foregoing invention has been described in terms of the embodiments discussed above, numerous variations are possible. Accordingly, modifications and changes such as those suggested above, but not limited thereto, are considered to be within the scope of the following claims.

What is claimed is:

1. An optical switch, comprising:
   a plurality of optical input ports, each of which carrying a respective one of a plurality of optical signals, at least selected ones of said plurality of optical signals having different wavelengths;
   a plurality of optical output ports; and
   a plurality of mirrors, each of said plurality of mirrors being configured to direct at least a portion of a respective one of said plurality of optical signals to a corresponding one of said plurality of optical output ports such that an intensity associated with each of said plurality of optical signals output from said optical switch is substantially the same.

2. An optical switch in accordance with claim 1, further comprising:
   a plurality of actuators, each of which being coupled to a respective one of said plurality of adjustable mirrors, and being configured to adjust a position of said respective one of said plurality of mirrors in accordance with a control signal.

3. An optical switch in accordance with claim 1, wherein said plurality of mirrors includes a first bank of mirrors and a second bank of mirrors.

4. An optical switch in accordance with claim 1, wherein each of said plurality of optical output ports includes a corresponding one of a plurality of optical waveguides, said plurality of optical signals being reflected by corresponding ones of said plurality of mirrors to one of said plurality of optical waveguides, each said plurality of optical waveguides receiving a variable portion of a respective one of said plurality of optical signals.

5. An optical switch in accordance with claim 1, wherein each of said plurality of mirrors includes a semiconductor material.

6. An optical switch in accordance with claim 5, wherein said semiconductor material includes silicon.

7. An optical switch comprising:
a plurality of optical input ports;
a plurality of optical output ports, each of which including a plurality of optical waveguides, each said plurality of optical waveguides having a receiving portion; and
a plurality of optical mirrors, each of which being configured to direct a corresponding one of a plurality of optical beams emanating from a respective one of said plurality of optical input ports to corresponding ones of said plurality of optical waveguides, one of said plurality of optical beams being reflected by a corresponding one of said plurality of mirrors to one of said plurality of waveguides, a central portion of one of said plurality of optical beams being spaced by an offset distance from a central portion of said receiving portion of one of said plurality of waveguides when said one of said plurality of optical beams impinges on said receiving portion of said one of said plurality of waveguides.

8. An optical switch in accordance with claim 7, further comprising:
a plurality of actuators, each of which being coupled to a respective one of said plurality of mirrors, and being configured to adjust a position of said respective one of said plurality of mirrors in accordance with a control signal.

9. An optical switch in accordance with claim 7, wherein said plurality of mirrors includes a first bank of mirrors and a second bank of mirrors.

10. An optical switch in accordance with claim 7, wherein said offset distance is variable.

11. An optical switch in accordance with claim 7, wherein each of said plurality of mirrors includes a semiconductor material.

12. An optical switch in accordance with claim 11, wherein said semicondcutor material includes silicon.

13. A method of routing a plurality of optical signals through an optical switch, said method comprising the steps of:
supplying first and second ones of said plurality of optical signals through respective first and second optical input ports;
impinging said first and second ones of said plurality of optical signals upon first and second optical waveguides, respectively, a central portion of said first one of said plurality of optical signals being offset from a central portion of said waveguide; and
outputting said first and second ones of said plurality of optical signals through said first and second optical waveguides, respectively, such that said first and second ones of said plurality of optical signals have substantially the same optical intensity.

14. A method in accordance with claim 13, further comprising the steps of:
feeding said first and second ones of said plurality of optical signals to corresponding first and second mirrors, respectively; and
reflecting said first and second ones of said plurality of optical signals with said first and second mirrors to thereby impinge on said first and second optical waveguides, respectively.

15. A method in accordance with claim 14, further comprising the step of reflecting said first and second ones of said plurality of optical signals with third and fourth mirrors, respectively, toward said first and second optical waveguides, respectively.

16. An optical communication device comprising:
an optical switch having a plurality of inputs and a plurality of outputs, each of said plurality of inputs receiving a respective one of a plurality of optical signals, said optical switch supplying each of said plurality of optical signals on a respective one of said plurality of outputs;
a plurality of receivers, each of which being configured to receive a respective one of said plurality of optical signals output from said optical switch; and
a control circuit coupled to said plurality of receivers, said control circuit being configured to sense a parameter associated with each of said received optical signals, and generate a control signal to said optical switch in response to said sensed parameter, said optical switch adjusting an optical intensity associated with each of said plurality of optical signals in response to said control signal.

17. An optical communication device in accordance with claim 16, further comprising:
an optical multiplexer coupled to optical switch, said optical multiplexer having a plurality of inputs, and an output, said plurality of inputs of said optical multiplexer being configured to receive a respective one of said plurality of optical signals, and said output being configured to supply said plurality of optical signals onto an optical communication path; and
an optical demultiplexer configured to be coupled to said optical communication path, said optical demultiplexer having an input and a plurality of outputs, said input receiving said plurality of optical signals, and outputting each of said plurality of optical signals on a respective one of said plurality of outputs, each of said plurality of optical receivers being coupled to a respective one of said plurality of outputs of said optical demultiplexer.

18. An optical communication device in accordance with claim 16, wherein said optical parameter is a signal-to-noise ratio.

19. An optical communication device in accordance with claim 16, wherein said optical switch comprises a plurality of optical mirrors, each of which being configured to direct a corresponding one of a plurality of optical signals emanating from a respective one of said plurality of optical switch inputs to a corresponding one of said plurality of optical switch outputs.

20. An optical communication device in accordance with claim 19, wherein each of said plurality of optical mirrors includes a semiconductor material.

21. An optical communication device in accordance with claim 16, wherein said control signal is adjusted so that said parameter associated with each of said plurality of optical signals is substantially the same.

* * * * *